(12) United States Patent
Imahori et al.

(10) Patent No.: US 12,473,655 B2
(45) Date of Patent: Nov. 18, 2025

(54) ELECTROLYTIC LIQUID PRODUCTION DEVICE

(71) Applicant: Panasonic Intellectual Property Management Co., Ltd., Osaka (JP)

(72) Inventors: Osamu Imahori, Shiga (JP); Kenichiro Inagaki, Shiga (JP); Tomohiro Yamaguchi, Shiga (JP); Minoru Nagata, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 538 days.

(21) Appl. No.: 17/789,949

(22) PCT Filed: Nov. 10, 2020

(86) PCT No.: PCT/JP2020/041833
§ 371 (c)(1),
(2) Date: Jun. 29, 2022

(87) PCT Pub. No.: WO2021/161600
PCT Pub. Date: Aug. 19, 2021

(65) Prior Publication Data
US 2023/0034950 A1 Feb. 2, 2023

(30) Foreign Application Priority Data

Feb. 14, 2020 (JP) ................. 2020-023380

(51) Int. Cl.
*C25B 9/63* (2021.01)
*C02F 1/461* (2023.01)
(Continued)

(52) U.S. Cl.
CPC ............. *C25B 9/63* (2021.01); *C02F 1/461* (2013.01); *C02F 1/46104* (2013.01);
(Continued)

(58) Field of Classification Search
CPC ....... C25B 9/63; C25B 1/461; C25B 1/46104; C25B 1/4672; C02F 1/461; C02F 1/46104; C02F 1/4672; C02F 1/42
See application file for complete search history.

(56) References Cited

U.S. PATENT DOCUMENTS 4,493,759 A * 1/1985 Boulton ............... C25B 9/00
  204/252
6,086,643 A * 7/2000 Clark .................. H01M 8/2404
  429/468

(Continued)

FOREIGN PATENT DOCUMENTS

JP 2016-064383 A 4/2016
JP 2017-176993 A 10/2017
(Continued)

OTHER PUBLICATIONS

International Search Report issued on Jan. 19, 2021 in International Application No. PCT/JP2020/041833, with English translation.

(Continued)

*Primary Examiner* — Luan V Van
*Assistant Examiner* — Alexander R. Parent
(74) *Attorney, Agent, or Firm* — Rimon P.C.

(57) ABSTRACT

An electrolytic liquid production device includes: an electrolyzer configured to perform electrolytic treatment to a liquid; an elastic body configured to press the electrolyzer; and a housing having the electrolyzer and the elastic body disposed inside the housing. The housing has an inlet port that the liquid supplied to the electrolyzer flows into, and an outlet port that an electrolytic liquid produced in the electrolyzer flows out from. The elastic body includes a positioning depressed portion, and the housing includes a positioning protruding portion. The elastic body is positioned with respect to the housing by inserting the positioning
(Continued)

protruding portion of the housing into the positioning depressed portion of the elastic body.

7 Claims, 8 Drawing Sheets

(51) Int. Cl.
| | | |
|---|---|---|
| *C02F 1/467* | (2023.01) | |
| *C25B 1/13* | (2006.01) | |
| *C25B 9/15* | (2021.01) | |
| *C25B 9/17* | (2021.01) | |
| *C25B 13/02* | (2006.01) | |

(52) U.S. Cl.
CPC ............. *C02F 1/4672* (2013.01); *C25B 1/13* (2013.01); *C25B 9/15* (2021.01); *C25B 9/17* (2021.01); *C25B 13/02* (2013.01); *C02F 2001/46147* (2013.01); *C02F 2001/46157* (2013.01); *C02F 2201/46115* (2013.01); *C02F 2201/782* (2013.01)

(56) References Cited

U.S. PATENT DOCUMENTS

| | | | |
|---|---|---|---|
| 11,613,821 B2 * | 3/2023 | Yamaguchi | ............. C25B 15/08 204/263 |
| 2015/0129419 A1 * | 5/2015 | Sekiguchi | ................. C25B 9/19 204/252 |
| 2017/0174539 A1 * | 6/2017 | Inagaki | .................. C02F 1/4672 |
| 2019/0055144 A1 * | 2/2019 | Inagaki | ............... C02F 1/46114 |
| 2020/0017983 A1 | 1/2020 | Yamaguchi et al. | |

FOREIGN PATENT DOCUMENTS

| | | | |
|---|---|---|---|
| KR | 10-2020-007708 A | 1/2020 | |
| WO | WO-2017168475 A1 * | 10/2017 | .......... C02F 1/46104 |
| WO | 2020/013254 A1 | 1/2020 | |

OTHER PUBLICATIONS

The EPC Office Action dated Apr. 12, 2023 for the related European Patent Application No. EP20918907.5.
The Indian OA dated Feb. 24, 2025 for the related Indian Patent Application No. 202247042650.

* cited by examiner

ELECTROLYTIC LIQUID PRODUCTION DEVICE

CROSS-REFERENCE OF RELATED APPLICATIONS

This application is the U.S. National Phase under 35 U.S.C. § 371 of International Patent Application No. PCT/JP2020/041833, filed on Nov. 10, 2020, which in turn claims the benefit of Japanese Patent Application No. 2020-023380, filed on Feb. 14, 2020, the entire disclosures of which applications are incorporated by reference herein.

TECHNICAL FIELD

The present disclosure relates to an electrolytic liquid production device.

BACKGROUND ART

Conventionally, there has been known an electrolytic liquid production device including an electrolyzer configured to perform electrolytic treatment to a liquid, an elastic body configured to press the electrolyzer, and a housing inside which the electrolyzer and the elastic body are disposed (see, for example, PTL 1).

The electrolytic liquid production device has an inlet port into which the liquid supplied to the electrolyzer flows and an outlet port from which an electrolytic liquid produced in the electrolyzer flows out, the inflow port and the outlet port being provided in the housing. The above electrolytic liquid production device performs the electrolytic treatment to water as the liquid supplied to the electrolyzer by applying a voltage to the electrolyzer to produce ozone as an electrolytic product. The electrolytic liquid production device dissolves the produced ozone in the water to produce ozone water as the electrolytic liquid.

At this time, in the electrolytic liquid production device of PTL 1, there is a possibility that the elastic body is not accurately positioned inside the housing, and the elastic body is biasedly disposed inside the housing. When the elastic body is biased, a pressing force to the electrolyzer changes depending on a location, and there is a risk that electrolytic treatment performance of the electrolytic part is not stabilized.

CITATION LIST

Patent Literature

PTL 1: Unexamined Japanese Patent Publication No. 2017-176993

SUMMARY OF THE INVENTION

The present disclosure provides an electrolytic liquid production device capable of suppressing bias of an elastic body inside a housing.

An electrolytic liquid production device of the present disclosure includes: an electrolyzer configured to perform electrolytic treatment to a liquid; an elastic body configured to press the electrolyzer; and a housing having the electrolyzer and the elastic body disposed inside the housing. The housing includes an inlet port that the liquid supplied to the electrolyzer flows into, and an outlet port that an electrolytic liquid produced in the electrolyzer flows out from. The elastic body includes a positioning depressed portion, and the housing includes a positioning protruding portion, and the elastic body is positioned with respect to the housing by inserting the positioning protruding portion of the housing into the positioning depressed portion of the elastic body.

According to the present disclosure, it is possible to provide an electrolytic liquid production device capable of suppressing bias of an elastic body inside a housing.

DESCRIPTION OF EMBODIMENT

Figure 1:
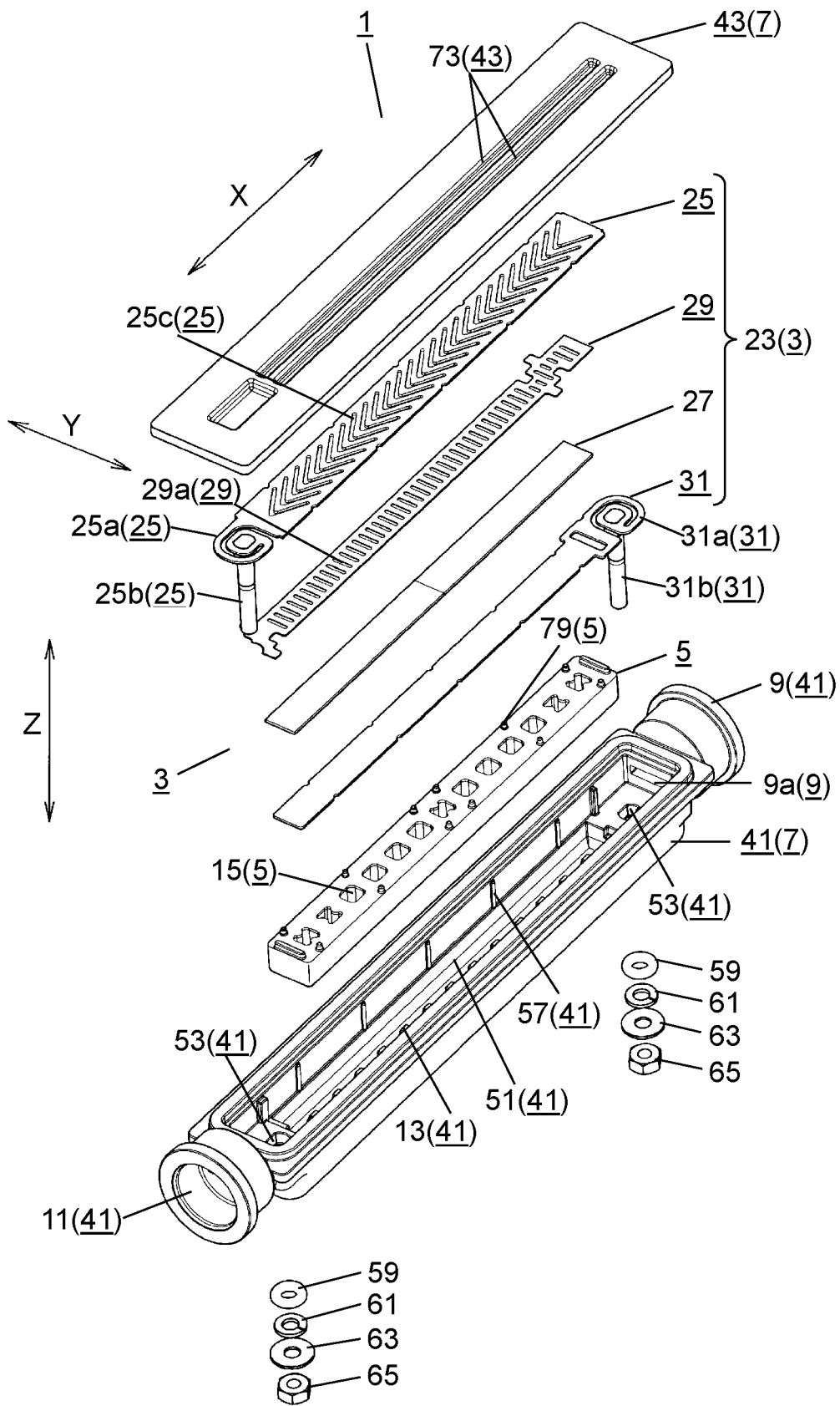
FIG. 1 is an exploded perspective view of an electrolytic liquid production device according to the present exemplary embodiment.

An exemplary embodiment will be described below in detail with reference to the drawings. However, unnecessarily detailed description may be omitted. For example, a detailed description of already well-known matters or a redundant description of substantially the same configuration may be omitted.

Note that, the accompanying drawings and the following description are only presented to help those skilled in the art fully understand the present disclosure, and are not intended to limit the subject matters as claimed in the claims.

Hereinafter, an ozone water production device will be described as an example of an electrolytic liquid production device. The ozone water production device generates ozone as an electrolytic product and dissolves ozone in water as a liquid to produce ozone water as an electrolytic liquid. Note that the ozone water has an advantage of not being persistent and not generating by-products, and is effective for sterilization and decomposition of organic substances. Therefore, the ozone water is widely used in water treatment fields and food and medical fields.

Note that assuming that an extension direction of a flow path (flowing direction of the liquid) is referred to as liquid flowing direction X, a width direction of the flow path is referred to as width direction (direction crossing the liquid flowing direction) Y, and a direction in which electrodes and a conductive film are stacked is referred to as stacking direction Z, a description will be given. In the present exemplary embodiment, assuming that stacking direction Z is defined as an up-down direction, and a side of an electrode case lid in a housing is defined as an upper side, a description will be given.

Furthermore, a description is given below while referring, as specific examples, ozone as the electrolytic product, water as the liquid, and ozone water as the electrolytic liquid.

Exemplary Embodiment

Hereinafter, electrolytic liquid production device 1 of the exemplary embodiment of the present disclosure will be described with reference to FIGS. 1 to 8.

As shown in FIGS. 1 to 8, electrolytic liquid production device 1 of the present exemplary embodiment includes electrolyzer 3, housing 7, elastic body 5, and the like.

As shown in FIGS. 1 to 4, electrolyzer 3 includes stacked body 23. Stacked body 23 includes cathode 25, anode 27, conductive film 29, power feeder 31, and the like.

Cathode 25 is formed using, for example, titanium. Cathode 25 is formed in, for example, a rectangular plate shape with liquid flowing direction X as a longitudinal direction, width direction Y as a short side direction, and stacking direction Z as a thickness direction. To cathode 25 is electrically connected feed shaft 25*b* for the cathode at one end of cathode 25 in the longitudinal direction (downstream side in liquid flowing direction X) via spiral spring portion 25*a*. Feed shaft 25*b* is electrically connected to a negative electrode of a power supplier (not shown).

Moreover, cathode 25 has a plurality of cathode holes 25*c* formed by penetrating cathode 25 in the thickness direction (stacking direction Z). Each of the plurality of cathode holes 25*c* is formed in a substantially identical (including identical) shape such as a V shape in the longitudinal direction (liquid flowing direction X). That is, the plurality of cathode holes 25*c* are provided so as to be aligned in a row at a predetermined pitch along the longitudinal direction (liquid flowing direction X). Note that the shape and arrangement of cathode holes 25*c* are not limited to the above form, and may be another form such as, for example, a straight line shape "lllll" similar to conductive film holes 29*a* described later. Moreover, it is sufficient that at least one cathode hole 25*c* is formed in cathode 25.

Anode 27 is formed, for example, by forming a conductive diamond film on a conductive substrate formed by using silicon. Note that the conductive diamond film has conductivity by boron doping and is formed on the conductive substrate by a plasma chemical vapor deposition (CVD) method. Anode 27 is formed in, for example, a rectangular plate shape with liquid flowing direction X as a longitudinal direction, width direction Y as a short side direction, and stacking direction Z as a thickness direction. Moreover, two sheets of anode 27 are disposed in a line along the longitudinal direction (liquid flowing direction X). Note that a reason for using the two sheets is that the conductive substrate is made of a material such as a silicon wafer, which is weak against impact, and the conductive substrate is easily broken in an elongated shape. Therefore, with the two-sheet configuration, a length of each of the sheets is shortened to make the conductive substrate difficult to break. Anode 27 is stacked together with cathode 25 with conductive film 29 interposed therebetween in stacking direction Z.

Moreover, conductive film 29 of stacked body 23 is formed using, for example, a proton conductive type ion exchange film. Conductive film 29 is formed in, for example, a rectangular plate shape with liquid flowing direction X as a longitudinal direction, width direction Y as a short side direction, and stacking direction Z as a thickness direction. Conductive film 29 has the plurality of conductive film holes 29*a* formed by penetrating conductive film 29 in the thickness direction (stacking direction Z).

Each of the plurality of conductive film holes 29*a* is formed in a substantially identical (including identical) shape such as, for example, a long hole shape extending in the short side direction (width direction Y). That is, the plurality of conductive film holes 29*a* are provided so as to be aligned side by side at a predetermined pitch along the longitudinal direction (liquid flowing direction X). Note that the pitch of the plurality of conductive film holes 29*a* may be the same as the pitch of cathode holes 25*c*, or may be different from the pitch of cathode holes 25*c*. Moreover, the shape and arrangement of conductive film holes 29*a* are not limited to the above form, and may be another form such as, for example, a V shape "<<<<<" similar to cathode holes 25*c*. Further, it is sufficient that at least one conductive film hole 29*a* is formed in conductive film 29.

Power feeder 31 is formed using, for example, titanium. Power feeder 31 is formed in, for example, a rectangular plate shape with liquid flowing direction X as a longitudinal direction, width direction Y as a short side direction, and stacking direction Z as a thickness direction. To power feeder 31 is electrically connected feed shaft 31*b* for the anode at another end of power feeder 31 in the longitudinal direction (on an upstream side in liquid flowing direction X) via spiral spring portion 31*a*. Feed shaft 31*b* is electrically connected to a positive electrode of the power supplier (not shown). Power feeder 31 is stacked on one surface side of anode 27 in stacking direction Z, and is disposed in contact with anode 27. This allows power feeder 31 to be electrically connected to anode 27.

That is, in stacked body 23 of the present exemplary embodiment, power feeder 31, anode 27, conductive film 29, and cathode 25 are stacked in this order from a lower side in stacking direction Z. Stacked body 23 has, in a portion of conductive film 29 stacked between cathode 25 and anode 27, interface 33 formed between cathode 25 and conductive film 29, and interface 35 formed between anode 27 and conductive film 29. Moreover, in a portion of stacked body 23 where cathode 25 and conductive film 29 are stacked, cathode holes 25*c* and conductive film holes 29*a* communicate with each other in stacking direction Z. Groove portions 37 are formed by conductive film 29, cathode holes 25*c*, and conductive film holes 29*a*. At this point, at least a part of each of interface 33 and interface 35 is exposed to groove portions 37. Further, groove portions 37 open into flow path 39 described later through which the liquid such as water flows. This allows the water to flow through groove portions 37.

In electrolyzer 3 having stacked body 23, first, the water flows through flow path 39, and then the water flows into groove portions 37. When a voltage is applied between cathode 25 and anode 27 by a power supply portion in a state where the water is flowing, a potential difference is generated between cathode 25 and anode 27 via conductive film 29. This potential difference energizes cathode 25, anode 27, and conductive film 29. Thereby, the electrolytic treatment is performed mainly in the water in groove portions 37, and ozone as the electrolytic product is generated near interface 35 between anode 27 and conductive film 29. The ozone generated dissolves in the water while being carried to a downstream side of flow path 39 along a water flow. As a result, the electrolytic liquid such as ozone water is produced. Electrolyzer 3 described above is disposed in housing 7.

Moreover, as shown in FIGS. 1 to 4, and 6, housing 7 of electrolytic liquid production device 1 is formed of, for example, a non-conductive resin such as polyphenylene sulfide (PPS). Housing 7 is configured of electrode case 41, electrode case lid 43, and the like.

Electrode case 41 of housing 7 has bottom wall portion 45 located on a lower side in stacking direction Z and peripheral wall portion 47. Peripheral wall portion 47 is erected upward in stacking direction Z from a peripheral edge portion of bottom wall portion 45, and is formed continuously in a peripheral direction. That is, electrode case 41 is formed in, for example, a rectangular housing shape in which an upper side of peripheral wall portion 47 is opened. Note that peripheral wall portion 47 has flange portion 49 disposed at an upper end. Flange portion 49 extends outward in a planar direction parallel to liquid flowing direction X and width direction Y, and is formed continuously in the peripheral direction of peripheral wall portion 47.

Further, electrode case 41 has containing depressed portion 51, a pair of through-holes 53, fitting protruding portion 55, inlet port 9, outlet port 11, and the like.

Containing depressed portion 51 is opened on the upper side of peripheral wall portion 47 and defined by inner surface 45a of bottom wall portion 45 and inner surface 47a of peripheral wall portion 47 to form an inner space of electrode case 41. Containing depressed portion 51 contains electrolyzer 3, elastic body 5, and the like from the opening side. Note that peripheral wall portion 47 has a plurality of positioning projections 57 formed on inner surface 47a. Positioning projections 57 are formed along liquid flowing direction X, and position cathode 25 of stacked body 23 with respect to housing 7.

The pair of through-holes 53 is respectively provided near end portions on the downstream side and the upstream side in liquid flowing direction X of bottom wall portion 45 of containing depressed portion 51. The pair of through-holes 53 is formed to penetrate bottom wall portion 45 in stacking direction Z. Feed shaft 25b of cathode 25, and feed shaft 31b of power feeder 31 are respectively inserted into the pair of through-holes 53 in a state where electrolyzer 3 is contained in containing depressed portion 51 of electrode case 41. Thereafter, below each of the pair of through-holes 53, O-ring 59, washer 61, spring washer 63, and hex nut 65 are assembled to each of feed shaft 25b and feed shaft 31b that are inserted. This allows feed shaft 25b and feed shaft 31b to be fixed to the pair of through-holes 53. In addition, this assembly allows the water to be cut off inside containing depressed portion 51.

Fitting protruding portion 55 is erected upward in stacking direction Z from an upper surface (for example, from flange portion 49) of peripheral wall portion 47, and is formed continuously in the peripheral direction. Fitting depressed portion 71 of electrode case lid 43 described later is fitted on fitting protruding portion 55, and electrode case lid 43 is positioned with respect to electrode case 41. Note that a plurality of fitting protruding portions 55 may be formed discontinuously in the peripheral direction.

Inlet port 9 is provided at a portion located on the upstream side in liquid flowing direction X in peripheral wall portion 47 of electrode case 41, and extends in a tubular shape toward the upstream side in liquid flowing direction X. Inlet port 9 is formed with, at a central portion thereof, hole 9a having a long hole shape penetrating peripheral wall portion 47 in liquid flowing direction X and communicating with containing depressed portion 51. To inlet port 9 is connected a pipe (not shown) for supplying the water, and the water is introduced into containing depressed portion 51.

Outlet port 11 is provided at a portion located on the downstream side in liquid flowing direction X in peripheral wall portion 47 of electrode case 41, and extends in a tubular shape toward the downstream side in liquid flowing direction X. Outlet port 11 is formed with, at a central portion thereof, a hole (not shown) with a long hole shape penetrating peripheral wall portion 47 in liquid flowing direction X and communicating with containing depressed portion 51. To outlet port 11 is connected a pipe (not shown) for discharging the ozone water, and the ozone water produced by electrolyzer 3 inside containing depressed portion 51 is led out.

Figure 2:
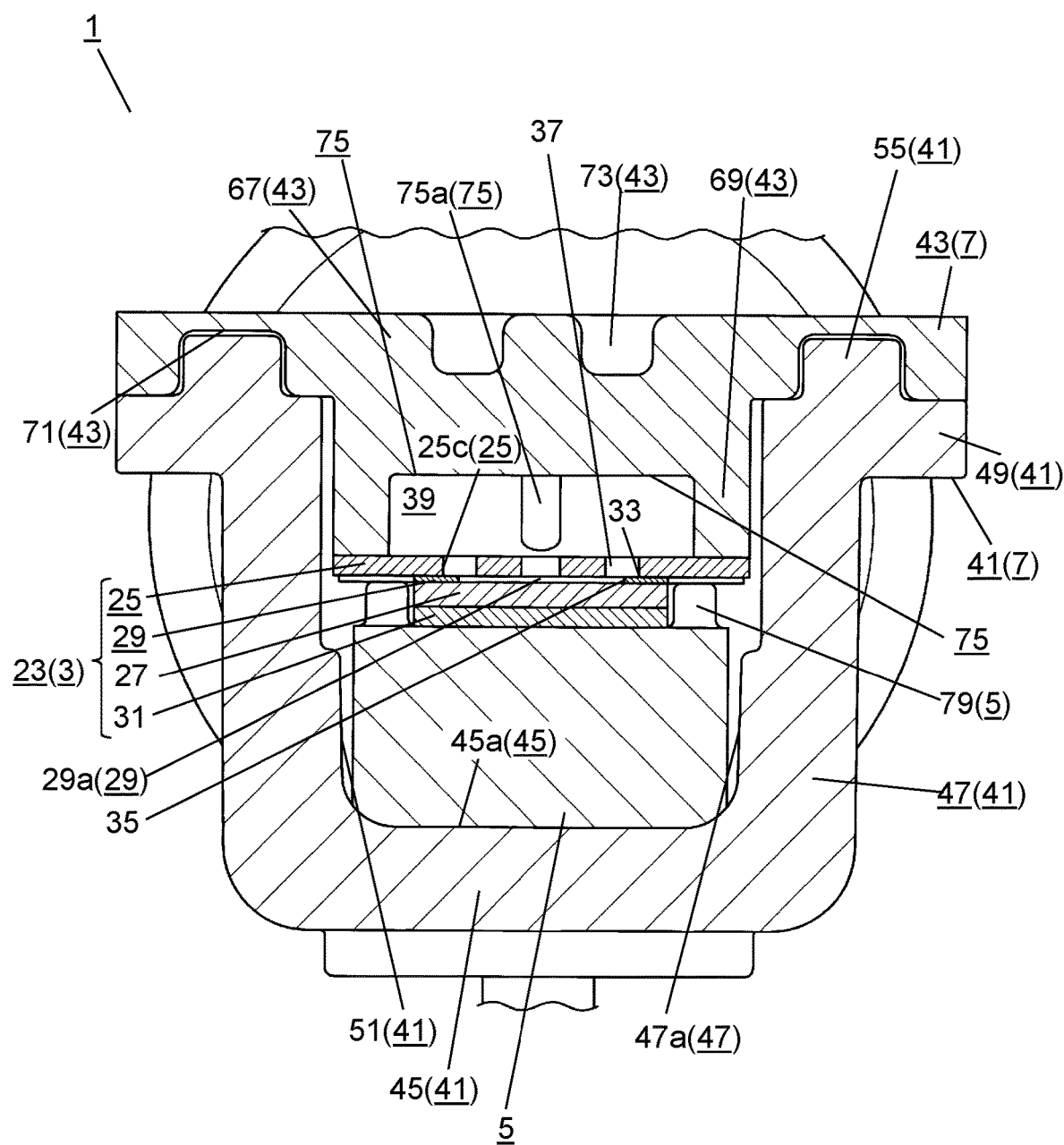
FIG. 2 is a cross-sectional view of the electrolytic liquid production device according to the same exemplary embodiment.
Figure 3:
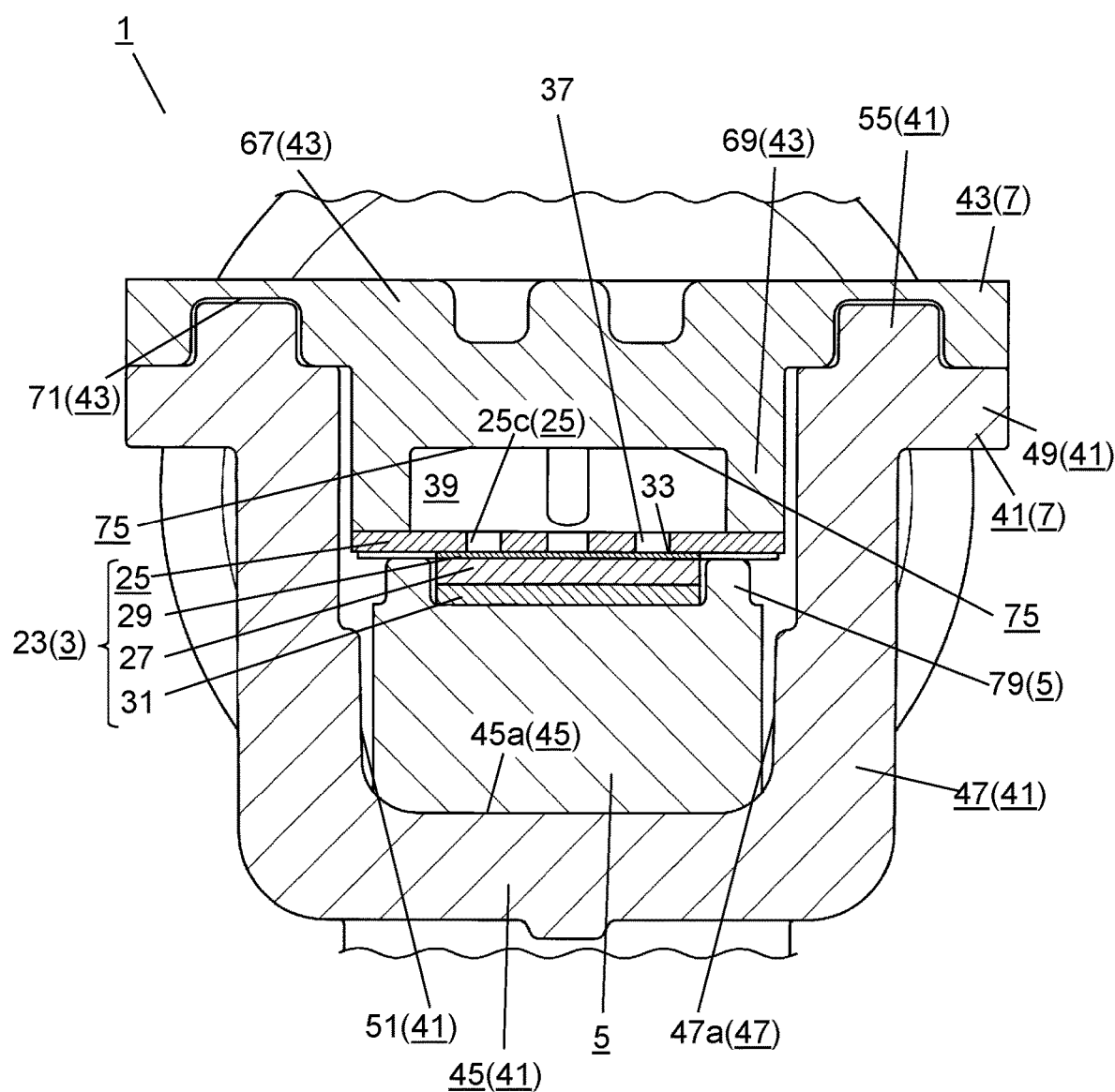
FIG. 3 is a cross-sectional view of the electrolytic liquid production device according to the same exemplary embodiment.
Figure 4:
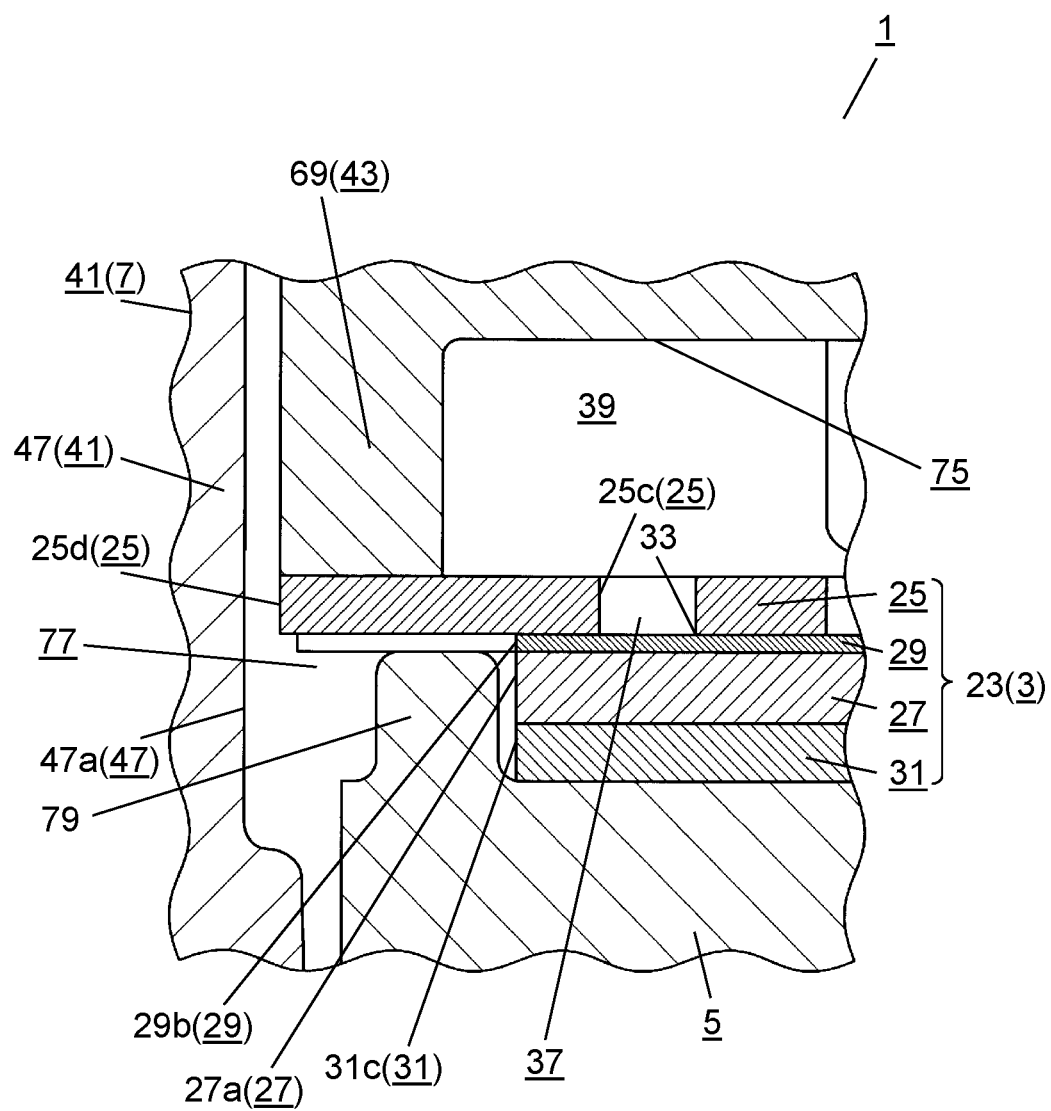
FIG. 4 is an enlarged view of a main part in FIG. 3.
Figure 5:
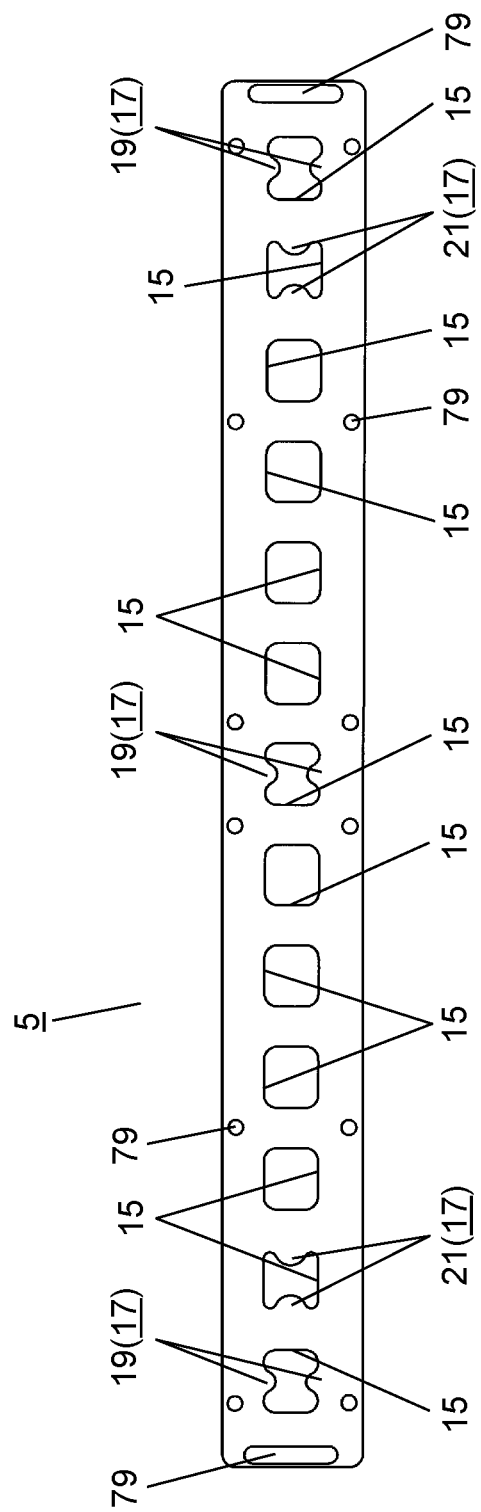
FIG. 5 is a top view of an elastic body of the electrolytic liquid production device according to the same exemplary embodiment.
Figure 6:
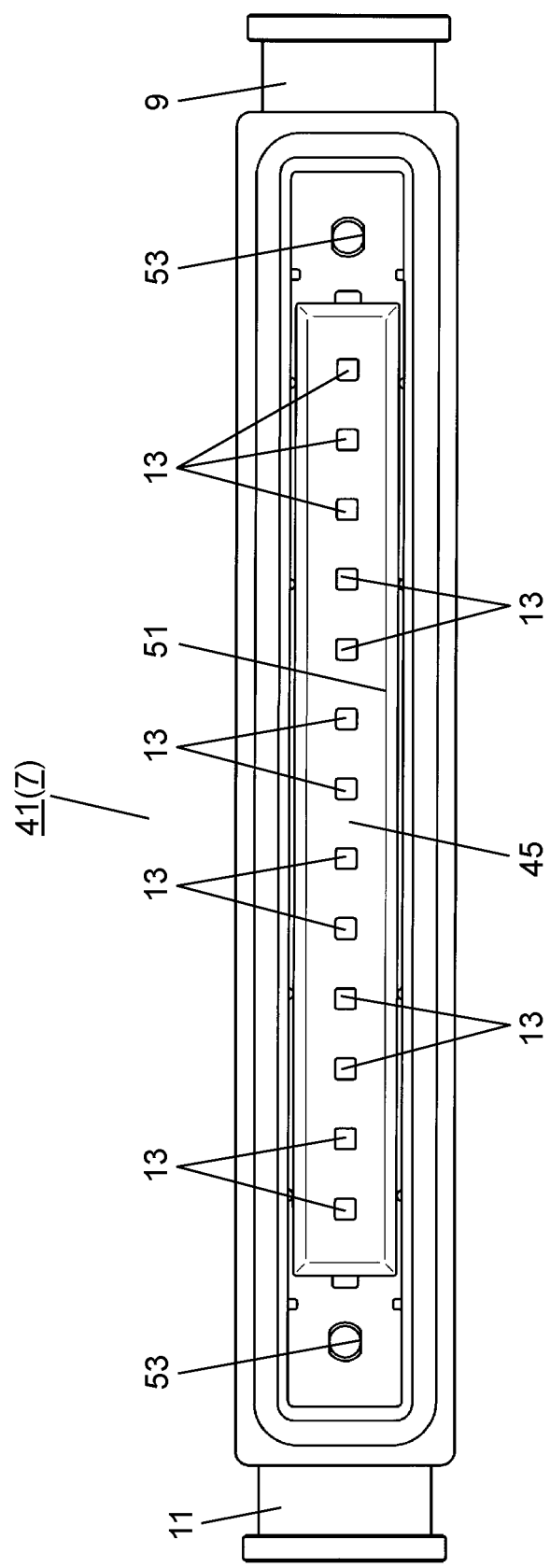
FIG. 6 is a top view of an electrode case of a housing of the electrolytic liquid production device according to the same exemplary embodiment.
Figure 7:
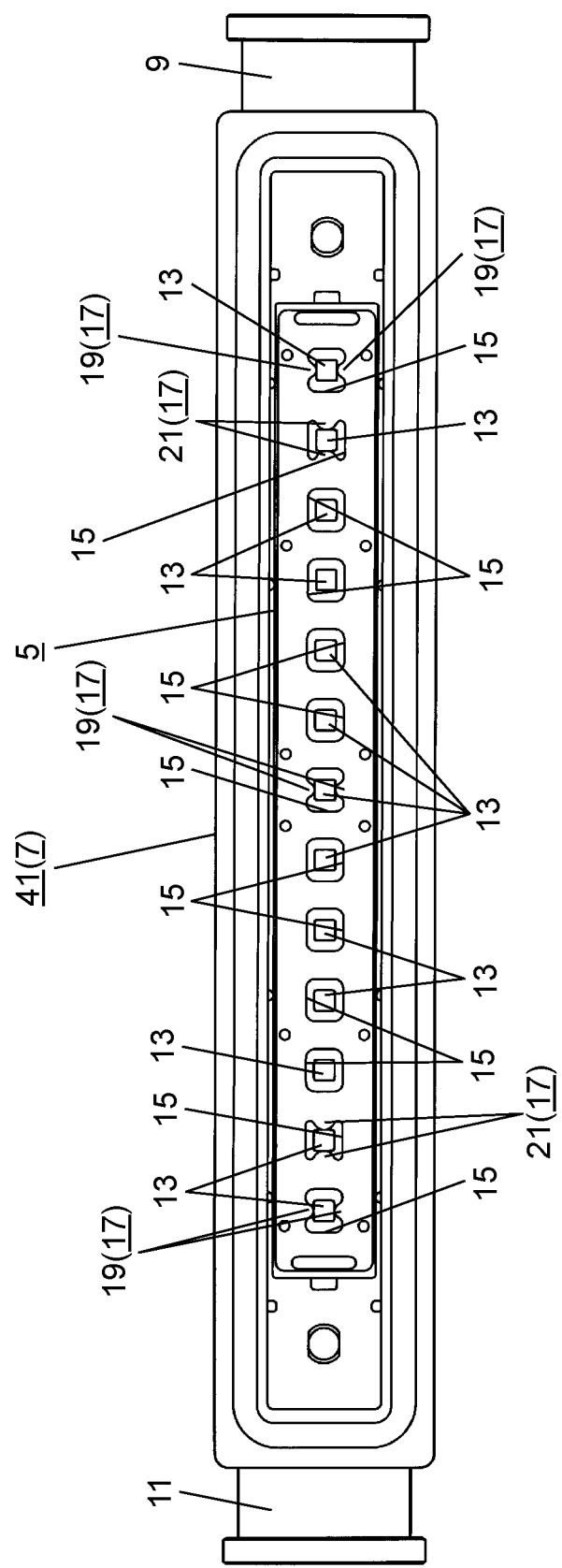
FIG. 7 is a top view when the elastic body is contained in the electrode case of the housing of the electrolytic liquid production device according to the same exemplary embodiment.
Figure 8:
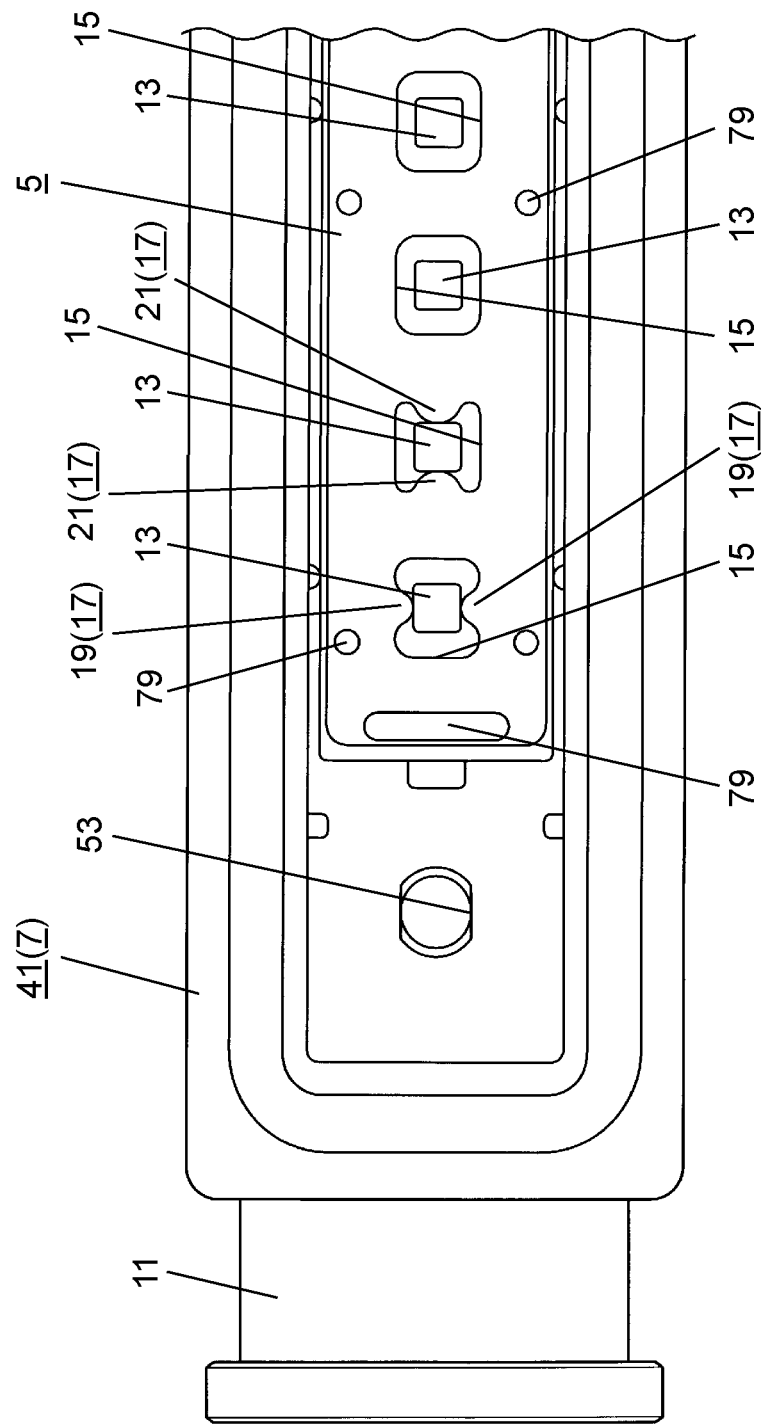
FIG. 8 is an enlarged view of a main part in FIG. 7.

Moreover. As shown in FIGS. 2 to 4, electrode case lid 43 of housing 7 includes rectangular lid body 67 located on the upper side in stacking direction Z, flow path protruding portion 69 erected downward in stacking direction Z in a rectangular shape from a lower surface in a central portion of lid body 67, and the like.

Lid body 67 has an outer shape formed to be substantially identical (including identical) to flange portion 49 of electrode case 41. That is, lid body 67 is configured to be able to close the opening of containing depressed portion 51 of electrode case 41. Lid body 67 has fitting depressed portion 71 that is formed continuously in the peripheral direction near an outer edge portion of a lower surface, and can be fitted on fitting protruding portion 55. The lower surface of lid body 67 is in contact with an upper surface of flange portion 49 of electrode case 41, and the contact surfaces thereof are welded in a state where fitting depressed portion 71 is fitted on fitting protruding portion 55. This welding allows the water to be cut off inside housing 7, and electrode case lid 43 to be fixed to electrode case 41.

Note that the fixing between electrode case 41 and electrode case lid 43 is not limited to the above welding method. For example, a sealing material may be interposed between electrode case 41 and electrode case lid 43, and electrode case 41 and electrode case lid 43 may be fixed by a fixing method such as screwing. In the case where the plurality of fitting protruding portions 55 are formed discontinuously in the peripheral direction, a plurality of fitting depressed portions 71 may be formed discontinuously in the peripheral direction so as to match the plurality of fitting protruding portions 55, and the fitting protruding portions and fitting depressed portions may be fitted and welded to each other.

Further, lid body 67 has grooves 73 formed on an upper surface. Grooves 73 are used for example, for positioning, catching, reverse insertion prevention and the like when electrolytic liquid production device 1 is assembled to an instrument or the like.

Flow path protruding portion 69 is formed to have an outer shape substantially identical (including identical) to an inner edge portion of the opening of containing depressed portion 51 of electrode case 41. Dimensions of an outer surface of flow path protruding portion 69 are set so as to have a slight gap with inner surface 47a of peripheral wall portion 47. This facilitates insertion of flow path protruding portion 69 into containing depressed portion 51 of electrode case 41.

Flow path protruding portion 69 is inserted into containing depressed portion 51 in a state where electrode case lid 43 is assembled to electrode case 41. This brings the lower surface of electrode case lid 43 into contact with a surface of cathode 25 of electrolyzer 3 to press stacked body 23 of electrolyzer 3 downward in stacking direction Z.

Moreover, flow path protruding portion 69 includes flow path groove 75 formed in a central portion of a lower surface along liquid flowing direction X.

Flow path groove 75 is divided by a plurality of cylindrical projecting portions 75a disposed along liquid flowing direction X in a central portion of flow path protruding portion 69 in width direction Y. This allows two flow path grooves 75 to be provided in width direction Y of flow path protruding portion 69. Each of flow path grooves 75 is open on a side of cathode 25 and on both sides in liquid flowing direction X. A width of flow path groove 75 in width direction Y is set substantially equal (including equal) to a width of groove portions 37 of electrolyzer 3 in width direction Y. With this setting, the water flowing in flow path groove 75 can be stably introduced into groove portions 37. In a state where flow path protruding portion 69 is in contact with cathode 25, flow path groove 75 described above forms, with the surface of cathode 25, flow path 39 through which the water flows.

That is, the water introduced into housing 7 from inlet port 9 flows into flow path 39. The water flowing into flow path 39 flows through groove portions 37 of electrolyzer 3 and is subjected to the electrolytic treatment to produce ozone as the electrolytic product. The produced ozone is dissolved in the water flowing through flow path 39 to produce ozone water. The produced ozone water flows through flow path 39 and is led out of housing 7 from outlet port 11.

In electrolytic liquid production device 1 of the present exemplary embodiment, elastic body 5 is disposed inside housing 7 where flow path 39 is formed.

Note that elastic body 5 shown in FIGS. 1 to 5 is configured using an elastic body having an elastic force such as, for example, rubber, plastic, or a metal spring. Elastic body 5 is formed in a rectangular parallelepiped shape whose outer surface shape is substantially identical (including identical) to an inner surface shape of containing depressed portion 51 of electrode case 41 on a side of bottom wall portion 45, and is configured to be containable in containing depressed portion 51. In the state contained in containing depressed portion 51, elastic body 5 has electrolyzer 3 stacked on an upper side in stacking direction Z. Then, in the stacked state, electrode case lid 43 is assembled to electrode case 41. At this time, flow path protruding portion 69 of electrode case lid 43 presses cathode 25 of stacked body 23 of electrolyzer 3 downward in stacking direction Z. This brings elastic body 5 into a state pressed downward in stacking direction Z.

At this time, elastic body 5 generates a repulsive force to restore toward the upper side in stacking direction Z against the pressing. This repulsive force of elastic body 5 applies an upward biasing force in stacking direction Z to electrolyzer 3. This brings stacked body 23 of electrolyzer 3 into close contact with flow path protruding portion 69 of electrode case lid 43 in stacking direction Z. Therefore, the contact in stacked body 23 is stabilized, and an energized area is maintained. As a result, a density of a current supplied to stacked body 23 can be equalized, and the electrolytic treatment performance in electrolyzer 3 can be stabilized. Note that a gap is formed between the outer surface of elastic body 5 and the inner surface of containing depressed portion 51 in a free state where elastic body 5 is not pressed. This gap allows deformation of elastic body 5 when elastic body 5 is elastically deformed.

As described above, in electrolytic liquid production device 1 of the present exemplary embodiment, a width of cathode 25 of stacked body 23 of electrolyzer 3 in width direction Y is set to be substantially equal (including equal) to a width of flow path protruding portion 69 of electrode case lid 43 in width direction Y. By setting the width of cathode 25 as described above, the openings of groove portions 37 formed by cathode holes 25c of cathode 25, conductive film holes 29a of conductive film 29, and anode 27 can be stably disposed with respect to flow path 39 formed between cathode 25 and flow path protruding portion 69. Further, flow path protruding portion 69 can stably press cathode 25 of electrolyzer 3 downward in stacking direction Z.

Moreover, a width of anode 27 of stacked body 23 in width direction Y is set to be narrower than the width of cathode 25 in width direction Y, and substantially equal (including equal) to a width of conductive film 29 in width direction Y. By setting the widths of anode 27 and conductive film 29 as described above, anode 27 and conductive film 29, which are expensive, can be downsized, and thus a cost can be reduced.

Moreover, a width of power feeder 31 of stacked body 23 in width direction Y is set to be substantially equal (including equal) to the width of anode 27 in width direction Y. By setting the width of power feeder 31 as described above, an energization area for anode 27 can be secured while power feeder 31 is downsized. Therefore, energization to anode 27 can be stabilized, and the electrolysis performance in electrolyzer 3 can be maintained.

Moreover, a width of elastic body 5 in width direction Y is set to be larger than the widths of anode 27 and power feeder 31 of stacked body 23 in width direction Y. By setting the width of elastic body 5 as described above, an outer edge portion of elastic body 5 can be disposed on the outer peripheries of anode 27 and power feeder 31. In addition, elastic body 5 can stably receive a pressing force applied to power feeder 31 from flow path protruding portion 69 of electrode case lid 43. This allows the biasing force to be stably applied to stacked body 23 of electrolyzer 3.

Note that in electrolytic liquid production device 1, when a minute gap is formed between an outer peripheral portion of electrolyzer 3 and an inner surface of housing 7, the liquid such as the water may enter, and stay in the minute gap. When ozone is generated by performing electrolytic treatment to the water in a state where the water stays around electrolyzer 3, a pH value of the water staying around electrolyzer 3 increases. As a result, scale mainly composed of a calcium component is likely to be generated around electrolyzer 3. When the scale is generated, the scale possibly accumulates in the minute gap. When the scale is accumulated around electrolyzer 3, there is a risk that electrolyzer 3 and housing 7 are deformed by being pressed by the scale.

Therefore, as shown in FIG. 4, in electrolytic liquid production device 1 of the present exemplary embodiment, space portion 77 for suppressing the staying of the water is formed between the outer peripheral portion of electrolyzer 3 and the inner surface of housing 7.

That is, space portion 77 is formed between inner surface 47a of peripheral wall portion 47 and each of side surfaces of stacked body 23 on both sides in width direction Y. Particularly, space portion 77 is formed between inner surface 47a of peripheral wall portion 47, and each of side surfaces 25d of cathode 25, each of side surfaces 27a of anode 27, each of side surfaces 29b of conductive film 29, and each of side surfaces 31c of power feeder 31.

Space portions 77 are formed inside housing 7 along liquid flowing direction X on both the sides of stacked body 23 in width direction Y, and communicate with inlet port 9 and outlet port 11, respectively. As a result, the water introduced from inlet port 9 flows through space portion 77 and is led out from outlet port 11 through space portion 77. Therefore, the water is restrained from staying around electrolyzer 3. By restraining the water from staying around electrolyzer 3, scale is restrained from being generated around electrolyzer 3. Thus, the deformation of electrolyzer 3 and housing 7 caused by accumulation of the scale can be more reliably suppressed. Note that space portion 77 may be configured to communicate with a middle of flow path 39. Therefore, because the water in flow path 39 and the water in space portion 77 easily flow, the suppression of the staying restrains the scale from being generated, so that an effect of extending a life is exerted.

That is, in electrolytic liquid production device 1 where space portion 77 is formed, in electrolyzer 3, anode 27 is formed so that the width thereof in width direction Y is narrower than the width of cathode 25 in width direction Y. By narrowing the width of anode 27, anode 27 can be downsized. However, downsizing anode 27 causes a risk that anode 27 cannot be directly positioned with respect to housing 7.

Therefore, in electrolytic liquid production device 1 of the present exemplary embodiment, as described above, at least anode 27 in stacked body 23 of electrolyzer 3 is positioned with respect to elastic body 5.

Further, as shown in FIGS. 1 to 5, elastic body 5 of the present exemplary embodiment includes, in a peripheral edge portion of an upper surface, a plurality of projecting portions 79 erected to project upward in stacking direction Z from the upper surface. A height of the plurality of projecting portions 79 in stacking direction Z is set to be substantially equal (including equal) to a total thickness of power feeder 31 and anode 27 so as to reach a height position of anode 27 in stacked body 23, anode 27 being stacked on elastic body 5. This allows anode 27 to be positioned by the plurality of projecting portions 79.

Among the plurality of projecting portions 79, the plurality of projecting portions 79 disposed along liquid flowing direction X on both sides in width direction Y are disposed so as to face, in width direction Y, side surfaces of anode 27 and side surfaces of power feeder 31 on both sides in width direction Y. Therefore, when anode 27 and power feeder 31 is made to move in width direction Y, anode 27 and power feeder 31 come into contact with projecting portions 79. This restricts movement of anode 27 and power feeder 31 in width direction Y.

Moreover, among the plurality of projecting portions 79, the plurality of projecting portions 79 disposed on both the sides in liquid flowing direction X are disposed so as to face, in liquid flowing direction X, the side surfaces of anode 27 and power feeder 31 on both sides in liquid flowing direction X. Therefore, when anode 27 and power feeder 31 is made to move in liquid flowing direction X, anode 27 and power feeder 31 come into contact with projecting portions 79. This restricts movement of anode 27 and power feeder 31 in liquid flowing direction X.

That is, the plurality of projecting portions 79 restrict the movement of anode 27 and power feeder 31 in the planar direction parallel to liquid flowing direction X and width direction Y. This allows anode 27 and power feeder 31 to be positioned with respect to elastic body 5 in the planar direction. As a result, the contact between anode 27 and power feeder 31 can be stabilized, and the electrolytic treatment performance in electrolyzer 3 can be maintained. In addition, this restricts movement of anode 27 and power feeder 31 toward space portion 77. This allows space portion 77 formed inside housing 7 to be stably maintained.

As described above, elastic body 5 that positions anode 27 and power feeder 31 of stacked body 23 is positioned with respect to housing 7. If the positioning of elastic body 5 with respect to housing 7 is insufficient, there is a risk that elastic body 5 is disposed biasedly inside housing 7. If elastic body 5 is biased, the pressing force applied to electrolyzer 3 in stacking direction Z varies depending on a place. As a result, there is a risk that the electrolytic treatment performance of electrolyzer 3 is not stabilized.

Therefore, in electrolytic liquid production device 1 of the exemplary embodiment, as shown in FIGS. 5 to 8, positioning protruding portions 13 are provided in housing 7, and positioning depressed portions 15 are provided in elastic body 5. Then, elastic body 5 is positioned with respect to housing 7 by fitting between positioning protruding portions 13 and positioning depressed portions 15.

Hereinafter, the positioning between elastic body 5 and housing 7 will be specifically described with reference to FIGS. 5 to 8 while referring to FIG. 1.

Note that hereinafter, a pressing direction of elastic body 5 to electrolyzer 3 is defined as stacking direction Z, and a planar direction orthogonal to stacking direction Z is defined as the planar direction parallel to liquid flowing direction X and width direction Y. In addition, a predetermined one direction (for example, a first direction) among the parallel directions is defined as width direction Y, which is the short side direction of elastic body 5 and housing 7. Furthermore, another direction (for example, a second direction) orthogonal to the predetermined one direction is defined as liquid flowing direction X, which is the longitudinal direction of elastic body 5 and housing 7.

As shown in FIG. 1, positioning protruding portions 13 of housing 7 are erected upward in stacking direction Z from bottom wall portion 45 of containing depressed portion 51 of housing 7. The plurality of positioning protruding portions 13 are disposed along liquid flowing direction X. An outer surface shape of each of positioning protruding portions 13 is, for example, a quadrangular shape. Note that the outer surface shape of positioning protruding portion 13 is not limited to the quadrangular shape, and may be any shape such as a circular shape.

As shown in FIGS. 5 to 8, each of positioning depressed portions 15 of elastic body 5 is configured of a hole formed to penetrate elastic body 5 in stacking direction Z. The plurality of positioning depressed portions 15 are disposed along liquid flowing direction X, corresponding to positioning protruding portions 13 of housing 7. Each of positioning depressed portions 15 is formed to have an inner surface shape of, for example, a quadrangular shape so as to contain positioning protruding portion 13 therein. Note that the inner surface shape of positioning depressed portion 15 is not limited to the quadrangular shape, and may be any shape as long as it is formed in a shape according to the outer surface shape of positioning protruding portion 13. Moreover, positioning depressed portion 15 may be formed in a depressed shape instead of the penetrating shape in which elastic body 5 is penetrated in stacking direction Z.

As to positioning protruding portions 13 and positioning depressed portions 15, when elastic body 5 is housed in containing depressed portion 51 of the housing 7, positioning protruding portions 13 are inserted into positioning depressed portions 15. That is, in a state where positioning protruding portions 13 are contained in positioning depressed portions 15, an inner surface of each of positioning depressed portions 15 is disposed to face an outer surface of each of positioning protruding portions 13. Therefore, when elastic body 5 is made to move in the planar direction parallel to liquid flowing direction X and width direction Y, the outer surfaces of positioning protruding portions 13 and the inner surfaces of positioning depressed portions 15 come into contact with each other. This restricts the movement of elastic body 5 in the planar direction inside containing depressed portion 51 of housing 7.

As described above, elastic body 5 is positioned with respect to housing 7 by positioning protruding portions 13 and positioning depressed portions 15. This can restrain elastic body 5 from being biasedly disposed inside housing 7. Therefore, the pressing force of elastic body 5 to electrolyzer 3 in stacking direction Z can be uniformly maintained, and the electrolytic treatment performance of electrolyzer 3 can be stabilized.

In a state where positioning protruding portions 13 are contained in positioning depressed portions 15, a gap is formed between the outer surface of each of positioning protruding portions 13 and the inner surface of each of positioning depressed portions 15. The gap is a space that allows the deformation of elastic body 5 when elastic body 5 is elastically deformed.

However, the gap allows the movement of elastic body 5 in the planar direction when elastic body 5 is only contained in containing depressed portion 51, so that elastic body 5 is in a free state.

Therefore, at least one of the plurality of positioning depressed portions 15 has projections 17 formed inside and projecting toward positioning protruding portion 13.

Projections 17 are each provided so as to project from the inner surface of positioning depressed portion 15 toward positioning protruding portion 13. A pair of projections 17 is formed from the inner surface of positioning depressed portion 15 with positioning protruding portion 13 sandwiched therebetween. Projections 17 come into contact with positioning protruding portion 13 when elastic body 5 is in the free state. Therefore, even when elastic body 5 is in the free state, elastic body 5 can be positioned with respect to housing 7. Note that projections 17 may be configured to have a minute gap with the outer surface of positioning protruding portion 13 as long as displacement of elastic body 5 is within an allowable range in the free state of elastic body 5.

In the present exemplary embodiment, positioning depressed portions 15 are provided with projections 17 including first projections 19 and second projections 21. First projections 19 and second projections 21 are disposed on inner surfaces of different positioning depressed portions 15.

First projections 19 are provided in positioning depressed portion 15 so as to project toward positioning protruding portion 13 from inner surfaces located on both sides in the short side direction (width direction Y) of elastic body 5. Therefore, when elastic body 5 is made to move in the short side direction (width direction Y), the outer surface of positioning protruding portion 13 and first projections 19 come into contact with each other. This restricts movement of elastic body 5 in the short side direction.

Positioning depressed portions 15 where first projections 19 are provided are disposed on both end sides in the longitudinal direction among the plurality of positioning depressed portions 15 disposed along the longitudinal direction (liquid flowing direction X) of elastic body 5. With the above disposition, both end portions in the longitudinal direction (liquid flowing direction X) of elastic body 5, which is easily bent in the short side direction (width direction Y), are positioned in the short side direction. This can reduce the bias of entire elastic body 5. The pressing force of elastic body 5 to electrolyzer 3 in stacking direction Z can be uniformly maintained. As a result, a concentration of the ozone water generated as the electrolytic liquid in electrolyzer 3 can be attained as intended with high accuracy.

Further, positioning depressed portion 15 where first projections 19 are provided is disposed in a central portion in the longitudinal direction among the plurality of positioning depressed portions 15 disposed along the longitudinal direction (liquid flowing direction X) of elastic body 5. With the above disposition, the central portion in the longitudinal direction (liquid flowing direction X) of elastic body 5, which is easily bent in the short side direction (width direction Y), is positioned in the short side direction. This can reduce the bias of entire elastic body 5. That is, elastic body 5 is positioned in the short side direction (width direction Y) by first projections 19 of positioning depressed portions 15 in both the end portions and the central portion in the longitudinal direction (liquid flowing direction X) of elastic body 5. This can further reduce the bias of entire elastic body 5 with respect to housing 7.

Second projections 21 are provided in positioning depressed portion 15 so as to project toward positioning protruding portion 13 from the inner surfaces located on both sides in the longitudinal direction (liquid flowing direction X) of elastic body 5. Therefore, when elastic body 5 is made to move in the longitudinal direction (liquid flowing direction X), the outer surface of positioning protruding portion 13 and second projections 21 come into contact with each other. This restricts the movement of elastic body 5 in the longitudinal direction.

Positioning depressed portion 15 where second projections 21 are provided are respectively disposed on both the end sides in the longitudinal direction and on an inner side of both the sides of positioning depressed portions 15 having first projections 19 among the plurality of positioning depressed portions 15 disposed along the longitudinal direction (liquid flowing direction X) of elastic body 5. With the above disposition, both the end portions in the longitudinal direction (liquid flowing direction X) of elastic body 5, which easily expands or contracts in the longitudinal direction (liquid flowing direction X), are positioned in the longitudinal direction. Therefore, the bias of entire elastic body 5 can be reduced. This allows the pressing force of elastic body 5 to electrolyzer 3 in stacking direction Z to be uniformly maintained. As a result, the concentration of the ozone water generated as the electrolytic liquid in electrolyzer 3 can be attained as intended with high accuracy.

Note that positioning depressed portion 15 where second projections 21 are provided may be disposed near the central portion in the longitudinal direction among the plurality of positioning depressed portions 15 disposed along the longitudinal direction (liquid flowing direction X) of elastic body 5. Even when positioning depressed portion 15 where second projections 21 are provided is disposed as described above, elastic body 5 can be positioned in the longitudinal direction against expansion and contraction of elastic body 5 in the longitudinal direction (liquid flowing direction X). This can reduce the bias of entire elastic body 5.

That is, first projections 19 and second projections 21 described above are respectively provided in different positioning depressed portions 15 among the plurality of positioning depressed portions 15 disposed along the longitudinal direction (liquid flowing direction X) of elastic body 5. As a result, positioning in the short side direction (width direction Y) and the longitudinal direction (liquid flowing direction X) of elastic body 5 can be performed more accurately in each of positioning depressed portions 15. This allows the pressing force of elastic body 5 to electrolyzer 3 in stacking direction Z to be uniformly maintained. As a result, the concentration of the ozone water generated as the electrolytic liquid in electrolyzer 3 can be attained as intended with high accuracy.

As described above, electrolytic liquid production device 1 of the present exemplary embodiment includes electrolyzer 3 configured to perform electrolytic treatment to a liquid, elastic body 5 configured to press electrolyzer 3, and housing 7 having electrolyzer 3 and elastic body 5 disposed inside housing 7. Housing 7 has inlet port 9 that the liquid supplied to electrolyzer 3 flows into and outlet port 11 that an electrolytic liquid produced in electrolyzer 3 flows out from. Elastic body 5 includes positioning depressed portion 15, and housing 7 includes positioning protruding portion 13. Elastic body 5 is positioned with respect to housing 7 by inserting positioning protruding portion 13 of housing 7 into positioning depressed portion 15 of elastic body 5.

According to this configuration, elastic body 5 can be positioned with respect to housing 7 by inserting positioning protruding portion 13 into positioning depressed portion 15, and the bias of elastic body 5 inside housing 7 can be reduced. This allows the pressing force of elastic body 5 to electrolyzer 3 to be uniformly maintained. As a result, the concentration of the electrolytic product of the electrolytic liquid generated in electrolyzer 3 can be attained as intended with high accuracy.

That is, electrolytic liquid production device 1 of the present exemplary embodiment can more reliably suppress the bias of elastic body 5 inside housing 7.

Moreover, positioning depressed portion 15 has projection 17 provided inside and projecting toward positioning protruding portion 13. Thereby, the gap between the outer surface of positioning protruding portion 13 and the inner surface of positioning depressed portion 15 is reduced, and the bias of elastic body 5 inside housing 7 can be further reduced. Therefore, the pressing force of elastic body 5 to electrolyzer 3 can be uniformly maintained. As a result, the concentration of the electrolytic product of the electrolytic liquid generated in electrolyzer 3 can be attained as intended with high accuracy.

Furthermore, projection 17 includes first projection 19 projecting in a predetermined one direction (width direction Y) in a planar direction orthogonal to a pressing direction (stacking direction Z) of elastic body 5 toward electrolyzer 3. According to this configuration, elastic body 5 can be positioned in the predetermined one direction against deformation of elastic body 5 in the predetermined one direction (width direction Y). This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Furthermore, projection 17 includes second projection 21 projecting in another direction (liquid flowing direction X) orthogonal to the predetermined one direction (width direction Y) in the planar direction orthogonal to the pressing direction (stacking direction Z) of elastic body 5 to electrolyzer 3. According to this configuration, elastic body 5 can be positioned in the other direction against deformation of elastic body 5 in the other direction (liquid flowing direction X). This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Moreover, a plurality of positioning protruding portions 13 and a plurality of positioning depressed portions 15 are disposed along the other direction (liquid flowing direction X) orthogonal to the predetermined one direction (width direction Y) in the planar direction orthogonal to the pressing direction (stacking direction Z) of elastic body 5 to electrolyzer 3. First projections 19 are provided in positioning depressed portions 15 disposed on both end sides in the other direction (liquid flowing direction X). According to this configuration, elastic body 5 can be positioned in the predetermined one direction against deformation of elastic body 5 in the predetermined one direction (width direction Y) on both the end sides in the other direction (liquid flowing direction X) of elastic body 5. Therefore, the bias of entire elastic body 5 can be reduced. This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Moreover, first projection 19 is provided in positioning depressed portion 15 disposed in a central portion in the other direction (liquid flowing direction X). According to this configuration, elastic body 5 can be positioned in the predetermined one direction against deformation of elastic body 5 in the predetermined one direction (width direction Y) in the central portion in the other direction (liquid flowing direction X) of elastic body 5. Therefore, the bias of entire elastic body 5 can be reduced. This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Further, second projection 21 is provided in at least one of positioning depressed portions 15. Thereby, elastic body 5 is positioned in the other direction against deformation of elastic body 5 in the other direction (liquid flowing direction X), and the bias of entire elastic body 5 can be reduced. As a result, the pressing force of elastic body 5 to electrolyzer 3 can be uniformly maintained. Thus, the concentration of the electrolytic product of the electrolytic liquid generated in electrolyzer 3 can be attained as intended with high accuracy.

Moreover, second projections 21 are provided in positioning depressed portions 15 disposed on both sides in the other direction (liquid flowing direction X). According to this configuration, elastic body 5 is positioned in the other direction against deformation of elastic body 5 on both the sides in the other direction (liquid flowing direction X) of elastic body 5, and the bias of entire elastic body 5 can be reduced. This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Further, first projection 19 and second projection 21 are provided in different positioning depressed portions 15. According to this configuration, positioning in the predetermined one direction (width direction Y) and the other direction (liquid flowing direction X) of elastic body 5 can be independently performed more accurately in each of positioning depressed portions 15. This allows the pressing force of elastic body 5 to electrolyzer 3 to be uniformly maintained. As a result, the concentration of the electrolytic product of the electrolytic liquid generated in electrolyzer 3 can be attained as intended with high accuracy.

Note that the above exemplary embodiment is to exemplify the techniques in the present disclosure, and therefore, various modifications, replacements, additions, omissions, and the like can be made in the scope of the appended claims or in an equivalent scope thereof.

For example, while in the above exemplary embodiment, the configuration in which the positioning protruding portion is provided in the housing and the positioning depressed portion is provided in the elastic body has been described as an example, the present disclosure is not limited thereto. For example, a configuration may be such that the positioning protruding portion is provided in the elastic body, and the positioning depressed portion is provided in the housing. This can simplify the configuration. As a result, production efficiency of the elastic body can be improved.

Moreover, while in the above exemplary embodiment, the configuration in which the positioning protruding portion is provided in the bottom wall portion of the housing and the positioning depressed portion is provided at the position corresponding to the positioning protruding portion of the elastic body has been described as an example, the present disclosure is not limited thereto. For example, the positioning protruding portion may be provided in a ridge shape along the stacking direction on the inner surface of the peripheral wall portion of the housing, and the positioning depressed portion may be provided in a groove shape along the stacking direction at a position corresponding to the positioning protruding portion on a side surface of the elastic body. That is, the positioning protruding portion and the positioning depressed portion may be formed at any positions or in any shapes.

Moreover, while in the exemplary embodiment, the configuration in which the pair of projections is provided on the inner surface in the positioning depressed portion has been described as an example, the present disclosure is not limited thereto. For example, the configuration may be such that the projection(s) is provided at one location or at three or more locations on the inner surface of the positioning depressed portion. Thereby, for example, a shape of a portion where low positioning accuracy is sufficient can be simplified, and a number of projections can be increased in a portion where high positioning accuracy is required, so that it is possible to flexibly cope with a portion as necessary.

Moreover, while in the above exemplary embodiment, the configuration in which the first projection and the second projection are provided in the different positioning depressed portions has been described as an example, the present disclosure is not limited thereto. For example, the configuration may be such that the first projection and the second projection are provided in the same positioning depressed portion. Thereby, it is possible to provide the projections near a portion where positioning accuracy is desired to be higher.

Moreover, while in the above exemplary embodiment, an example in which the elastic body and the housing are formed in a rectangular shape has been described, the present disclosure is not limited thereto. For example, the elastic body and the housing may be formed in another polygonal shape such as a square shape or a pentagonal shape, a circular shape, or any shape. Thereby, it is possible to meet design needs of various users.

INDUSTRIAL APPLICABILITY

The present disclosure is applicable to an electrolytic liquid production device capable of suppressing bias of an elastic body inside a housing, and increasing a concentration of an electrolytic product in a liquid subjected to electrolytic treatment. The present disclosure can be specifically applicable to water treatment equipment such as water purifiers, washing machines, dish washers, warm water washing toilet seats, refrigerators, water heaters/servers, sterilizers, medical instruments, air conditioners, kitchen equipment, and the like.

REFERENCE MARKS IN THE DRAWINGS

1: electrolytic liquid production device
3: electrolyzer
5: elastic body
7: housing
9: inlet port
9a: hole
11: outlet port
13: positioning protruding portion
15: positioning depressed portion
17: projection
19: first projection
21: second projection
23: stacked body
25: cathode
25a, 31a: spring portion
25b, 31b: feed shaft
25c: cathode hole
25d, 27a, 29b, 31c: side surface
27: anode
29: conductive film
29a: conductive film hole
31: power feeder
33, 35: interface
37: groove portion
39: flow path
41: electrode case
43: electrode case lid
45: bottom wall portion
45a, 47a: inner surface
47: peripheral wall portion
49: flange portion
51: containing depressed portion
53: through-hole
55: fitting protruding portion
57: projection
59: O-ring
61: washer
63: spring washer
65: hex nut
67: lid body
69: flow path protruding portion
71: fitting depressed portion
73: groove
75: flow path groove
75a: cylindrical projecting portion
77: space portion
79: projecting portion
X: liquid flowing direction (other direction)
Y: width direction (predetermined one direction)
Z: stacking direction (pressing direction of elastic body to electrolyzer)

The invention claimed is:

1. An electrolytic liquid production device comprising:
an electrolyzer configured to perform electrolytic treatment to a liquid;
an elastic body configured to press the electrolyzer; and
a housing having the electrolyzer and the elastic body disposed inside the housing, wherein:

the housing includes an inlet port that the liquid supplied to the electrolyzer flows into, and an outlet port that an electrolytic liquid produced in the electrolyzer flows out from, the elastic body includes a plurality of positioning depressed portions, and the housing includes a plurality of positioning protruding portions, the elastic body is positioned with respect to the housing by inserting the plurality of positioning protruding portions of the housing into the plurality of positioning depressed portions of the elastic body, respectively, each of the plurality of positioning depressed portions includes a first projection provided inside and projecting in a first direction within a plane orthogonal to a pressing direction of the elastic body to the electrolyzer, and a second projection provided inside and projecting in a second direction orthogonal to the first direction within the plane, the plurality of positioning protruding portions and the plurality of positioning depressed portions are disposed along the second direction, respectively, and the first projection and the second projection are provided in different positioning depressed portions of the plurality of positioning depressed portions from each other.

2. An electrolytic liquid production device comprising:

an electrolyzer configured to perform electrolytic treatment to a liquid;

an elastic body configured to press the electrolyzer in a pressing direction; and a housing having the electrolyzer and the elastic body disposed inside the housing, wherein:

the housing includes an inlet port that the liquid supplied to the electrolyzer flows into, and an outlet port that an electrolytic liquid produced in the electrolyzer flows out from, the inlet port and the outlet port being arranged along a liquid flow direction, the elastic body includes a plurality of positioning depressed portions, and the housing includes a plurality of positioning protruding portions, both arranged in the liquid flow direction, the elastic body is positioned with respect to the housing by inserting the plurality of positioning protruding portions of the housing into the plurality of positioning depressed portions of the elastic body, respectively, and one of the plurality of positioning depressed portions includes a first projection projecting in a width direction within a plane orthogonal to the pressing direction, and another of the plurality of positioning depressed portions includes a second projection projecting in the liquid flow direction orthogonal to the width direction within the plane, and none of the plurality of positioning depressed portions includes both the first projection and the second projection.

3. The electrolytic liquid production device according to claim 2, wherein the first projection is provided in positioning depressed portions, among the plurality of positioning depressed portions, disposed on both end sides in the liquid flow direction, respectively.

4. The electrolytic liquid production device according to claim 2, wherein:

the first projection is provided in one of the plurality of positioning depressed portions disposed closer to a center of the elastic body than both end sides of the elastic body in the liquid flow direction.

5. The electrolytic liquid production device according to claim 2, wherein at least one of the plurality of positioning depressed portions includes neither the first projection nor the second projection.

6. The electrolytic liquid production device according to claim 2, wherein the second projection is provided in at least one of the plurality of positioning depressed portions.

7. The electrolytic liquid production device according to claim 6, wherein the second projection is provided in positioning depressed portions disposed on both sides in the liquid flow direction, respectively.

* * * * *